United States Patent Office 3,342,900
Patented Sept. 19, 1967

3,342,900
PROCESS OF GRAFTING ACRYLONITRILE ONTO PEROXIDIZED POLYETHYLENE
Nelson S. Marans, Silver Spring, Md., assignor to W. R. Grace & Co., New York, N.Y., a corporation of Connecticut
No Drawing. Filed May 5, 1964, Ser. No. 365,154
1 Claim. (Cl. 260—877)

The present application is a continuation-in-part of my earlier application S.N. 131,748, filed Aug. 16, 1961, now abandoned.

This invention relates to the grafting of polyethylene and particularly to a method by which grafting sites are generated by oxygen containing groups which are the potential grafting sites.

It is known that polyolefins containing tertiary carbon atoms, such as polypropylene, may be heated at relatively low temperatures in the presence of oxygen to create peroxide grafting sites therein. For example, U.S. Patent 3,022,191 to Cappuccio et al. discloses that polypropylene may be heated in air at temperatures ranging from 50–120° C. to form peroxidic groups on the polymeric chain. This peroxidic polypropylene may then be contacted with a $CH_2=C<$ group containing monomers whereupon grafting will occur.

While grafting methods such as disclosed by Cappuccio et al. are satisfactory for polypropylene, it has been found that polyethylene which contains mainly the more difficult to oxidize secondary carbon atoms, can not be satisfactorily grafted using the techniques applied to polypropylene.

It is therefore an object of the present invention to provide a method by which polyethylene may be economically and efficiently grafted with $CH_2=C<$ group containing monomers.

It is another object to provide a method by which peroxidic grafting sites may be quickly established in polyethylene in an economical manner.

These and still further objects of the present invention will become readily apparent to one skilled in the art from the following detailed description and specific examples.

Broadly, my invention comprises heating polyethylene at a temperature above the melting point thereof, and preferably at from about 145 to 160° C., in the presence of oxygen for a time sufficient to establish peroxidic groups therein, and subsequently contacting in the absence of oxygen the peroxidic containing polyethylene with a monomer containing a $CH_2=C<$ grouping at a temperature of from about 80 to 110° C. to achieve a desired degree of grafting.

More specifically, I have made the surprising finding that polyethylene having a density of from about 0.95 to 0.97 may be heated to above its melting point in the presence of oxygen for a time preferably from 0.08 to about 5 hrs. to form active grafting sites therein. Due to the fact the polyethylene is in the molten state the oxygen diffuses throughout the substrate at a rapid rate. These active grafting sites possess sufficient persistence in the molten state to allow the activated polyethylene to be later transferred to a grafting environment where grafting may take place.

My finding is particularly unexpected in that it has heretofore generally been believed that to achieve successful grafting; the grafting sites must be established and maintained in the solid state. However, maintenance of the solid state prevents rapid diffusivity of the oxygen and furthermore in the case of polyethylene prevents the use of temperatures sufficiently high to create peroxidic sites on the secondary carbon atoms thereof.

The following examples illustrate specific practices of the present invention.

Example I

The initial material, high-density polyethylene, 0.7 melt index, 0.96 density prepared without the use of an antioxidant was placed in an oven heated to 150° C. The samples were maintained in the oven for the times given in the following table. The final sheet was 20–30 mils thick and formed on melting of pellets.

The specific viscosity of each sample was determined to give an index of the degradation which had occurred during the heating process. Thereafter the individual samples were placed in containers which were connected to a vacuum source. Following evacuation to a high value, monomer was admitted into each container and the containers were heated to 80° C. and maintained at this temperature for a period of 96 hrs. After this time, the samples were removed, thoroughly washed by rinsing with two washes of benzene and two with acetone to remove any adherent monomer or small quantities of homopolymer. Each wash continued for one hour. Thereafter, the gain in weight of the sample was determined.

TABLE I

| Material | Monomer | Time of Heating (hrs.) | $(\eta)$ sp., C. | $\frac{w-w_0}{w_0} \times 100\%$ |
|---|---|---|---|---|
| Polyethylene 0.96 density, 0.7 melt index. | Acrylonitrile. | 0.00 | 2.38 | 0.0 |
|  |  | 0.08 | 1.36 | 4.1 |
|  |  | 0.25 | 0.69 | 60.8 |
|  |  | 0.50 | 0.89 | 52.4 |
|  |  | 0.75 | 1.28 | 27.8 |
|  |  | 1.00 | ---------- | 46.1 |
|  |  | 2.00 | ---------- | 44.6 |
|  |  | 3.00 | ---------- | 47.3 |
|  |  | 4.00 | ---------- | 62.7 |
|  |  | 5.00 | ---------- | 8.2 |

Example II

The experiment was repeated but instead of pellets, the same GREX polyethylene initially was in the form of crumb.

TABLE II

| Material | Monomer | Time of Heating (hrs.) | $(\eta)$ sp., C. | $\frac{w-w_0}{w_0} \times 100\%$ |
|---|---|---|---|---|
| Polyethylene 0.96 density, 0.7 melt index. | Acrylonitrile. | 0.00 | 2.34 | 0.00 |
|  |  | 0.08 | 2.67 | 1.7 |
|  |  | 0.25 | 2.05 | 3.6 |
|  |  | 0.50 | 1.67 | 4.4 |
|  |  | 0.75 | 0.77 | 5.3 |
|  |  | 1.00 | ---------- | 2.8 |
|  |  | 2.00 | ---------- | 2.5 |
|  |  | 3.00 | ---------- | 0.0 |

Example III

High density polyethylene, melt index 0.7, density 0.96, was pressed into 30 mil sheets at 180° C. and 6,000 p.s.i. Samples that measured 4.0 cm. in length and 0.6 cm. in width were placed in individual 2 inch diameter aluminum cups and heated in an oven for the designated time at the described temperature. The sample was weighed and placed in a 8 mm. I.D. tube and then 3 grams of acrylonitrile added. The contents of the tube, while cooled in a Dry Ice-acetone bath, were evacuated to less than 0.5 mm. Hg pressure and the tubes then sealed. The evacuated tubes were placed in an oven at 80° C. for 20 hrs. After this heating the tubes were opened the sample treated with N,N-dimethylformamide for one hour, then with acetone and again with acetone. The dried samples were then weighed and the percentage grafting determined by the following equation:

$$\frac{Wf - Wi}{Wi} \times 100\%$$

where $Wf$ is the final weight and $Wi$ is the initial weight.

The percentage gain for a sample that was not heated in the oven but went through the grafting procedure was 0.4%. All of the results are corrected for this blank.

TABLE III

[Percentage grafting as a function of time and temperature of heating polyethylene in air in an oven]

| Run | Time of Heating (hrs.) | Temp. of Heating (° C.) | Grafting, Percent |
|---|---|---|---|
| 1 | 0.25 | 160 | 0.2 |
| 2 | 0.50 | | 1.5 |
| 3 | 1.0 | | 6.9 |
| 4 | 1.5 | | 30.3 |
| 5 | 2.0 | | 42.0 |
| 6 | 3.0 | | 69.8 |
| 7 | 5.0 | | 98.1 |
| 8 | 1.0 | 120 | 0.0 |
| 9 | 2.3 | | 0.0 |
| 10 | 4.0 | | 0.0 |
| 11 | 21.0 | | 0.0 |
| 12 | 2.0 | 80 | 0.0 |
| 13 | 5.0 | | 0.0 |
| 14 | 22 | | 0.0 |
| 15 | 22 | | 0.0 |

The data of Table III clearly illustrates that heating below the melting points, i.e. Runs 8–15 at 80–120° C., produces no grafting. Evidently, at temperatures below the melting point substantially no grafting sites are formed in polyethylene.

Conducting the grafting reaction in an inert atmosphere (nitrogen) gave substantially the same results.

Desirably the temperature which is maintained throughout the grafted reaction should be kept at a low value to prevent the generation of any substantial proportions of homopolymer, and desirably about 80° C. Temperatures of 110° C. can be tolerated if the grafting reaction is not one of long duration.

Suitable monomers are compounds containing the grouping $CH_2=C<$ and specifically compounds of the type $RHC=CH_2$ and $RR'C=CH_2$. For $RHC=CH_2$, R can be $-COOC_2H_5$ and $R'$ can be $-CH_3$. The examples given are not designed to be restrictive and such compounds as the alkyl acrylates and methacrylates, acrylic acid, acrylamide and methacrylamide, ethylene derivatives such as the halosulphonated ethylenes, vinylidene chloride, methacrylonitrile and substituted butadienes would be operative in the process.

This process permits the material to be given thermoset characteristics in varying degrees. The grafted polymers possess a greatly increased resistance to oxidative degradation when compared to polymers treated in the same manner but which are not grafted. In addition to being thermoset, the grafted polymers may retain certain elastic properties even after long exposure to the atmosphere.

I claim:

A process for grafting polyethylene which comprises heating polyethylene to a temperature of about 145–160° C. to attain a molten state in the presence of oxygen for from about 0.08 to about 5 hours to establish peroxidic grafting sites therein, and reacting said peroxidized polyethylene with acrylonitrile at a temperature of less than about 100° C. to achieve grafting of said polyethylene.

References Cited

FOREIGN PATENTS 234,314 6/1961 Australia.
783,790 10/1957 Great Britain.

SAMUEL H. BLECH, *Primary Examiner.*

D. J. BREZNER, *Assistant Examiner.*